Feb. 10, 1959 — W. PALMER — 2,873,445
HYPERBOLIC NAVIGATION RECEIVER
Filed March 28, 1956 — 2 Sheets-Sheet 1
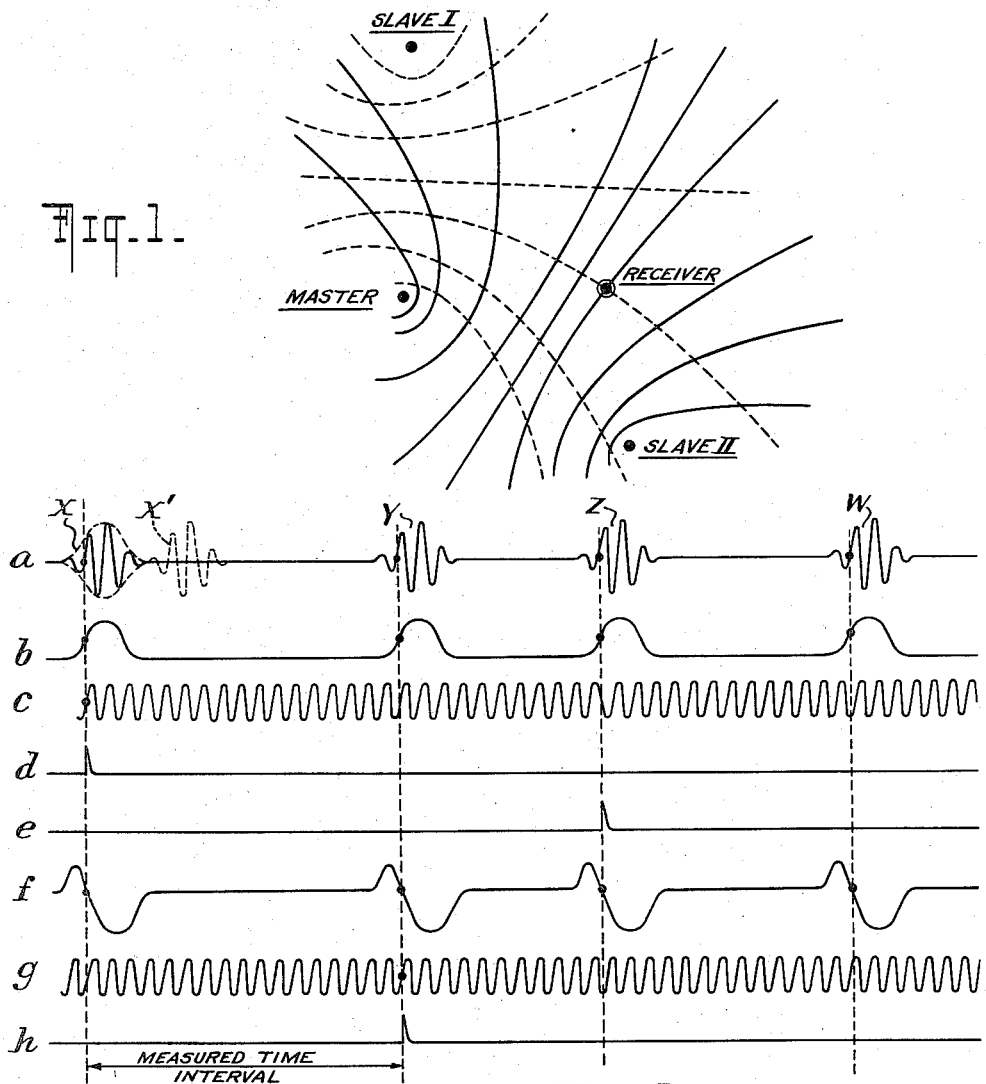
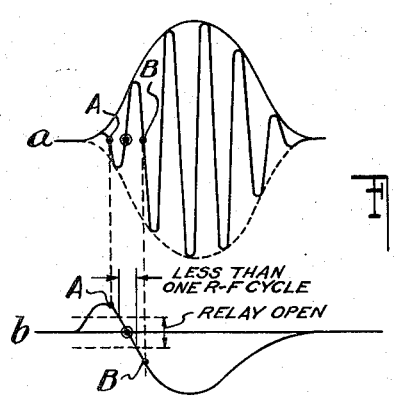
INVENTOR
WINSLOW PALMER
BY
ATTORNEY

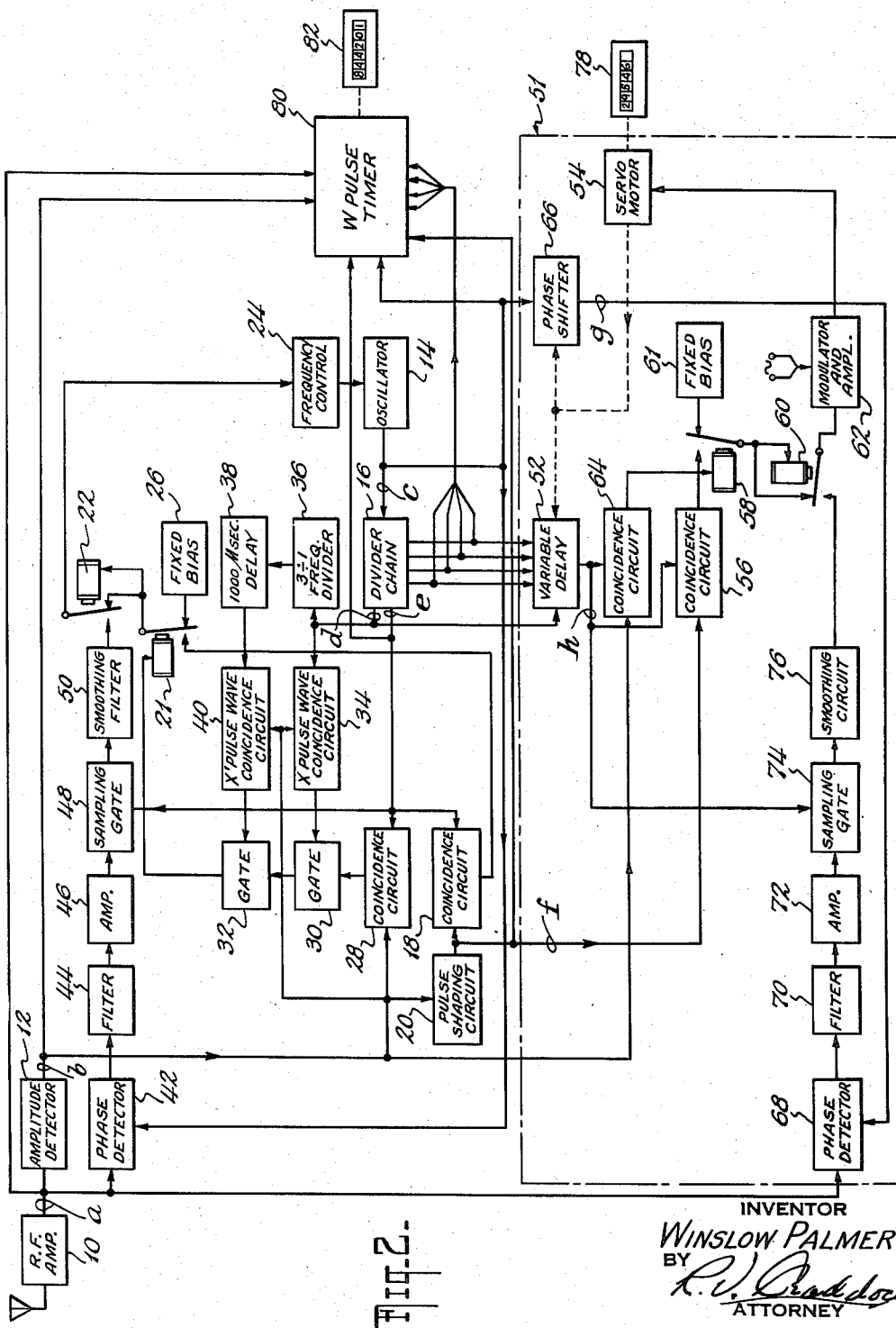

United States Patent Office 2,873,445
Patented Feb. 10, 1959

2,873,445

HYPERBOLIC NAVIGATION RECEIVER

Winslow Palmer, Amityville, N. Y., assignor to Sperry Rand Corporation, a corporation of Delaware Application March 28, 1956, Serial No. 574,475

10 Claims. (Cl. 343—103)

This invention relates to radio receivers for hyperbolic navigation systems, and more particularly, is concerned with receiving apparatus for automatically and accurately indicating the time difference between radio frequency pulses produced by the master and slave stations in a loran type navigation system.

Radio navigational systems of the pulsed hyperbolic type for determining a hyperbolic line of position are well known in the art. In such systems, known as loran, this line of position is determined by measuring at the receiving station the difference in travel time of two pulsed radio signals which are transmitted from two known widely spaced locations. Knowing the velocity of radio waves, the difference in travel time can be converted to a difference in distance from the two known locations. The difference in distance determines the hyperbolic line of position.

Standard loran systems use frequencies of the order of 1850 kc. and a pulse duration of approximately 40 microseconds. Groundwave range over water is limited to approximately 800 miles and is considerably less over land. In an effort to extend the groundwave range, to simplify operation, and to obtain higher accuracy, low frequency loran systems have been set up and tested at an allocated frequency of 100 kc. Due to bandwidth limitations at the lower frequency of not more than 20 kc., the rise time of the transmitted pulses is required to be at least 50 microseconds and the minimum length of the pulse cannot be less than 100 microseconds. Since the required maximum error of measurement is considerably less than the length of a pulse, the time measurement must be made between corresponding points on the pulses, for example, the points of inflection on the rising edge of the pulses. The longer the rise time, however, the more difficult it is to determine with precision a particular point on the pulse envelope for time measurement.

As a result, cycle matching has been proposed in which time measurements are made, not between points on the envelope of the pulses but between corresponding points on the R.-F. cycles of the radio frequency carrier. The time of a point on an R.-F. cycle, such as a zero cross-over point, can be determined with much greater precision than a point on the pulse envelope, because the slope of the cycle on passing through zero must necessarily be much steeper than the slope of the pulse envelope which contains the cycle.

One evident difficulty in using the cycle matching technique in which the time measurement is made between zero cross-over points in the cycles of the respective pulses is that unless the corresponding cross-over point in relation to the pulse envelopes are used, the time measurement will be off by the amount of a cycle or more. This is to say that a cyclic ambiguity exists in the cycle matching technique of time measurement since a number of zero cross-over points for the cycles exist during the received pulses.

It is the general object of this invention to provide a completely automatic receiver for use with a pulsed hyperbolic navigation system.

Another object of this invention is to provide an automatic receiver utilizing cycle matching for improved accuracy.

Another object of this invention is the provision of a fully automatic receiver for a low frequency long range loran system.

These and other objects of the invention which will become apparent as the description proceeds are achieved by the provision of a receiver comprising a local oscillator and divider for generating respectively a C.-W. signal at the R.-F. frequency of the received signals and for generating pulses at the pulse repetition frequency of the received master pulses. A first servo loop responsive to the local pulses and the received master pulse envelopes controls the oscillator to establish coincidence between the local pulses and received master pulses. A second servo loop responsive to the carrier of the received master pulses and the output of the oscillator controls the oscillator to establish phase coherence between the local C.-W. signal and the carrier of the received master pulses. A switching circuit on the input to the oscillator frequency control is arranged to provide control of the oscillator by the first servo until coincidence between the local and received master pulses is achieved and then the second servo is permitted to take over control to complete a cycle match for more accurate control of the local oscillator.

A time measurement is achieved by provision of third and fourth servo loops for controlling a variable delay network and a variable phase shifter which are mechanically ganged together and are coupled respectively to the outputs of the divider and the oscillator. The third servo loop, responsive to the delayed pulses from the variable delay network and the slave pulses, controls the delay network to establish coincidence between the local delay pulses and slave pulses. The fourth servo loop, responsive to the output of the variable phase shifter and the carrier of the received slave pulses, controls the phase shifter to establish phase coherence between the slave carrier and the phase shifter output. A switching circuit on the input to the variable delay and phase shifter control means is arranged to provide control by the third servo loop until coincidence between the local pulses and the received slave pulses is achieved and then to permit the fourth servo loop to take over and complete a cycle match, whereby coarse and fine adjustment of the ganged variable delay circuit and phase shifter is achieved. A mechanical counter ganged with the variable delay network and phase shifter indicates the correct time measurement.

For a better understanding of the invention reference should be had to the accompanying drawing wherein:

Fig. 1 is a diagram illustrating the principles of loran navigation;

Fig. 2 is a block diagram of the preferred embodiment of the present invention;

Fig. 3 shows the waveform of and time relationship among various signals generated by the apparatus disclosed in Fig. 2; and Fig. 4 is a series of graphical plots used for explaining the pulse matching and cycle matching operation of the apparatus of Fig. 2.

According to the present disclosure, receiving apparatus is provided for automatically measuring the time intervals between the pulses produced by a low frequency triad loran transmitting system in which the phase of the radio frequency cycles produced by the master and slave stations are synchronized in phase with each other. Moreover the transmitters provide a fixed predetermined phase relationship between the R.-F. cycles and the pulse envelopes.

There are three transmitters forming the loran triad, a master station and first and second slave stations positioned so that the transmission pattern of each station covers the region which the system serves, as shown in the diagram of Fig. 1. The master station is arranged to transmit pulses of R.-F. energy at fixed time intervals and at a fixed repetition rate. One of the slave stations radiates a pulse at a fixed time after one pulse from the master station, and the other slave station radiates a pulse at a fixed time after the next pulse from the master station. Pulses as received at the receiving station are shown in Fig. 3a, in which the two master station pulses are designated X and Z respectively with the pulse from the first slave station being designated Y and the pulse from the second slave station being designated W. In order to identify the X pulses from the master station to establish a repetition interval, an X' pulse is provided which is merely the X pulse relayed a brief interval of time, such as 1,000 microseconds, every third recurrence. It should be noted, however, that other pulse identifying patterns or means may be used with corresponding modifications of equipment, without departing from the scope of this invention.

For use with the receiving apparatus disclosed herein, the radio frequency cycles comprising the pulses emitted by each slave station must have a fixed predetermined phase relation to the radio frequency cycles comprising the pulses emitted by the master station. Also the radio frequency cycles comprising the pulses emitted by the slave stations and the master station must have a fixed predetermined phase relationship to the respective envelopes thereof.

The receiving station receives the respective pulses at times dependent upon the distance between the receiving station and the respective transmitters as well as the time relationships between the master and slave pulses. Each hyperbolic curve indicated by a solid line in Fig. 1 shows the locus of receiving points for which the time delay between the master pulses Z and slave pulses W has a certain constant value. Each hyperbolic curve indicated by a dashed line shows the locus of receiving points for which the time delay between the master pulses X and slave pulses Y has a certain constant value. Thus the time delay between the Z and W pulses and between the X and Y pulses at a receiving station located within the radiation pattern of the three transmitters serve to determine two hyperbolic curves on which the receiving station is located. The intersection of the two hyperbolic curves, as plotted on a suitable loran chart, determines the point at which the receiving station is situated.

The time relationship between the master and slave pulses is such that the X pulses are received prior to the Y pulses and the Z pulses are received prior to the W pulses at any receiving point within the region which the system serves. Furthermore the time relationship is such that at any receiving point within the region which this system serves, the Y pulses are received only during the interval of time between the X and Z pulses and the W pulses are received only during the interval of time between the Z and X pulses. Thus the sequence of the signals which occur at the receiving point during each recurrence period is X, Y, Z, and W as indicated in Fig. 3a.

Referring to Fig. 2, the numeral 10 indicates generally a radio frequency amplifier for receiving and amplifying the incoming master and slave signals. The output of R.-F. amplifier 10, having the waveform as shown in Fig. 3a, is coupled to an amplitude detector 12 from which the pulse envelopes of the received signals are derived, as shown in Fig. 3b.

The receiver further includes a local oscillator 14, which is preferably crystal controlled to provide a highly stable oscillator whose output frequency is substantially equal to the carrier frequency of the received signals. The output of the oscillator, as shown in Fig. 3c, is coupled to a divider chain 16 that preferably includes a series of blocking oscillator dividers followed by a bistable multivibrator. Two trigger pulse trains as derived from the divider chain in which the trigger pulses occur at substantially the repetition rate of the X pulses from the master station. The pulses in the two trigger pulse trains are displaced a half repetition period from each other, so that by proper phasing with relation to the incoming pulses as derived from the amplitude detector 12, the pulses of one trigger pulse train can be made coincident with the X pulses and the pulses of the other pulse train can be made coincident with the Z pulses. The waveforms of the trigger pulse trains derived from the divider circuit 16 are shown in Figs. 3d and 3e.

In order to synchronize the trigger pulses from the divider chain 16 with the received X and Z pulses, one of the trigger outputs, such as the triggers at the output $e$ of the divider chain 16 are coupled to a coincidence circuit 18. The coincidence circuit is also coupled to the output of the amplitude detector 12 by means of a pulse shaping circuit 20, which preferably is a circuit arranged to take the derivative of the received pulse envelope from the amplitude detector 12 and combine it with the inverse of the received pulse envelope to produce an output pulse having a waveform shown in Fig. 3f and also in Fig. 4b. A suitable pulse shaping or derivative circuit is shown in the disclosure of U. S. Patent application Serial No. 471,170 filed March 26, 1954 in the name of Robert L. Frank.

The coincidence circuit 18 is arranged to produce a D.-C. output voltage that varies in magnitude depending on the degree of coincidence between the output of the pulse shaping circuit 20 and the triggers derived from the divider chain 16. A suitable coincidence circuit is described in Patent No. 2,636,988. The output of the coincidence circuit 18 is a function of the time relation between the output of the pulse shaping circuit 20 and the trigger from the divider chain 16, and has the same form as the curve of Fig. 4b. Thus the output of the coincidence circuit 18 goes to zero when the trigger pulses from the divider chain 16 are coincident with the cross-over point O of the output pulses from the pulse shaping circuit 20 and varies substantially linearly between the points A and B on either side of the cross-over point O as the time relationship between the triggers and the derived pulses varies.

The output of the coincidence circuit 18 is coupled through a pair of switching relays 21 and 22 in series, when the relays are energized (in a manner hereinafter to be described), to an automatic frequency control circuit 24 associated with the oscillator 14. The frequency control circuit 24 may be a conventional reactance tube circuit used in well known automatic frequency control systems by means of which the frequency of the oscillator 14 is shifted in response to the output of the coincidence circuit 18 so as to bring the triggers at the output of the divider chain 16 into coincidence with the cross-over point of the derived pulse from the pulse shaping circuit 20.

Before the coincidence circuit 18 can be used to control the oscillator 14, it is necessary that the trigger pulses at the output $e$ of the divider chain 16 be brought into substantial coincidence with the cross-over point of the derived envelope pulse from the pulse shaping circuit 20. Furthermore, it is necessary that the trigger $e$ from the divider chain 16 be brought into substantial coincidence with the Z pulse and be prevented from locking into coincidence with the received X, Y, or W pulses.

For this reason the relay 21 is provided which normally connects a fixed bias source 26 to the second relay 22. The fixed bias is of sufficient magnitude to close the relay 22 thereby connecting the output of the fixed bias to the frequency control circuit 24. The effect of the fixed bias is to reduce the frequency of the oscillator 14 whereby the pulse repetition rate of the triggers at the output of the divider chain 16 is made slower than the repetition rate of the incoming pulses. The relay 21 is energized only when the triggers from the divider chain 16 are brought into substantial coincidence with the proper received pulse. The time constant of the relay 22 is such that it does not open when the current through the relay 22 is momentarily interrupted by the switching of relay 21 from fixed bias control to control by the coincidence circuit 18.

The relay 21 is energized in response to the output of a coincidence circuit 28 to which is coupled trigger pulses from the output e of the divider chain 16 and also the envelope pulses from the amplitude detector 12. The output of the coincidence circuit 28, which is similar to the coincidence circuit 18, is coupled through a pair of gate circuits 30 and 32 to the relay 21 when substantial coincidence occurs between the trigger and the envelope pulses. If the gates 30 and 32 are open, the relay 21 will be energized.

In order to insure that the coincidence circuit 28 synchronizes with the Z pulses without ambiguity, use is made of the ghost pulse X', which, as described above, occurs every third cycle when the X pulse is delayed at the transmitter a thousand microseconds. Triggers from the output d of the divider chain 16 are coupled to an X pulse coincidence circuit 34 which controls the gate 30 and through a 3:1 divider circuit 36 and thousand microsecond delay 38 to a coincidence circuit 40 which controls the gate 32. The coincidence circuits 34 and 40 are also coupled to the output of the amplitude detector 12. Only when the triggers from the output d of the divider chain 16 are in coincidence with the X pulses will both the gates 30 and 32 be opened. Thus the relay 21 can only be energized when the triggers from the output d of the divider chain 16 are in substantial coincidence with the received X pulses and when the triggers from the output e of the divider chain 16 are in substantial coincidence with the received Z pulses.

In order to effect more accurate time measurement by cycle matching in the automatic receiver system of the present invention, it is necessary that the output of the oscillator 14 be made phase coherent with the carrier of the received master pulses. This is achieved by a second servo loop for controlling the oscillator 14 which includes a phase detector 42 coupled to the output of the oscillator 14 and to the output of the R.-F. amplifier 10. The output of the phase detector 42 is proportional to the cosine of the phase angle between the input signals and goes to zero only when the carrier is 90° out of phase with the local oscillator signal.

The output of the phase detector 42 is filtered by the filter circuit 44 to remove the R.-F. components and is coupled through an amplifier 46 to a sampling gate 48. The sampling gate 48 is triggered open by the trigger pulses from the output e of the divider chain 16 so that the output of the phase detector is sampled only during the leading edge of the received Z pulses. A suitable sampling gate circuit is described in more detail in the copending application Serial No. 91,659 filed May 6, 1949 in the name of Philip W. Crist now Patent No. 2,811,716, issued October 29, 1957.

The output from the sampling gate 48 is coupled to a smoothing circuit 50 which may be a low pass filter, or integrating circuit having a long time constant, whereby the output of the smoothing circuit 50 is proportional to the D.-C. component of the output of the sampling gate 48. The output of the smoothing circuit 50 is connected by the relay 22 to the frequency control circuit 24 whereby, when the relay 22 is open, the oscillator 14 is adjusted in frequency to bring the output of the oscillator into phase coherence with the carrier of the Z pulse.

From the description thus far it will be seen that two servo loops are provided, one involving the coincidence circuit 18 for achieving a pulse match between the output of the divider chain and the incoming pulse envelopes, and a second servo loop including a phase detector 42 for providing phase coherence between the output of the oscillator 14 and the R.-F. carrier of the master pulses. The two servo loops include the same local C.-W. source and pulse generating source in the oscillator 14 and divider chain 16. Adjustment of either the pulse repetition rate by the first servo loop or the frequency by the second servo loop necessarily affects both the pulse repetition rate and the frequency at the same time. Therefore the phase relation between the received carrier and pulse envelope must be a fixed predetermined amount so that coincidence between the locally generated triggers and the received pulses is maintained by the second servo loop. In this way the second servo loop acts as a fine adjustment on the coincidence of the received pulses and the locally generated triggers.

In the operation, the fixed bias 26 causes the oscillator frequency to be low so that the local triggers shift in phase with respect to the received pulses until substantial coincidence between the locally generated trigger pulses and the received master pulses occurs. The first servo loop is then brought into operation by the relay 21 to adjust the oscillator so as to maintain coincidence between the locally generated triggers and the received master pulses. By operation of the relay 22, when alignment between the triggers and the received pulses is achieved, extremely accurate control of the oscillator 14 is achieved by the cycle matching servo to maintain phase coherence between the oscillator and the received master carrier signal.

In order to make a time measurement between the X and Y pulses, a Y pulse timer circuit, indicated generally at 51, is provided having a second similar pair of servo loops to control locally generated triggers in coincidence with the Y pulses and to control a local C.-W. signal in phase coherence with the carrier of the Y pulses. The locally generated pulse coincidence with the received Y pulses is produced by means of a variable delay circuit 52 coupled to the trigger pulse output of the divider chain 16, which is preferably of the type described in Patent No. 2,621,238. The variable delay 52 utilizes a plurality of harmonically related signals derived from the divider chain 16 to produce output pulses that are accurately controlled in time in response to a shaft rotation. A servomotor 54 actuates the input shaft of the variable delay circuit 52 to produce the desired delay in the delay circuit 52. The output of the delay circuit 52 is shown in Fig. 3h.

The delay output triggers from the variable delay circuit 52 are coupled to a coincidence circuit 56 which is similar to the above-described coincidence circuit 18. The coincidence circuit 56 is also coupled to the output of the derivative circuit 20. The coincidence circuit produces a D.-C. error signal indicative of the displacement between the delayed trigger and the cross-over point of the derived Y pulse from the derivative circuit 20. This error signal from the coincidence circuit is connected through a relay 58 and relay 60 to a modulator and amplifier circuit 62 by means of which it controls the A.-C. servomotor 54. The relay 58 is arranged so that it normally connects a fixed bias 61 to the relay 60, energizing the relay 60 to connect the fixed bias to the input of the modulator and amplifier circuit 62. The relay 58 in turn is controlled by the output of a coincidence circuit 64 coupled to the delayed trigger pulse from the variable delay circuit 52 and to the output of the amplitude detector 12. When substantial coincidence occurs between the Y pulse and the trigger from the delay circuit 52, the coincidence circuit 64 closes the relay 58 thereby interrupting the fixed bias and providing control of the servomotor 54 by the output of the coincidence circuit 56. The servomotor is controlled by the coincidence circuit 56 to make the output trigger from the delay circuit 52 coincident with the cross-over point of the derived Y pulse from the derivative circuit 20.

In order to provide an accurate time measurement involving cycle matching, when the coincidence circuit 56 produces substantial match between the local trigger and the received Y pulses, the output of the coincidence circuit 56 is reduced substantially to zero permitting the relay 60 to drop out and connect a cycle matching servo loop to the servomotor 54 as hereinafter described.

The cycle matching loop includes a variable phase shifter 66 coupled to the output of the local oscillator 14. The output of the phase shifter 66, shown in Fig. 3g, is coupled to a balanced phase detector 68 where it is compared with the phase of the carrier of the received pulses from the R.-F. amplifier 10. The output of the phase detector 68 is a voltage pulse wave whose amplitude is proportional to the cosine of the phase angle between the two waves which are compared. This output voltage is applied to a filter 70 for removing the R.-F. components of the phase detector output. The filtered signal is coupled through an amplifier 72 to a sampling gate 74, similar to the sampling gate 48, but triggered by the output of the variable delay circuit 52. Thus the output of the phase detector is sampled during the leading edge of the received Y pulses. The output of the sampling gate is applied to a smoothing circuit 76, similar to the smoothing circuit 50 described above, by which a signal proportional to the D.-C. component of the sampling gate output signal is derived. The output of the smoothing circuit 76 is connected by the relay 60 to the modulator and amplifier 62 to the servomotor 54 which adjusts the phase shifter 66 to reduce the output of the phase detector 68 to zero.

The phase shifter 66 is preferably a continuously variable type such as described in Patent No. 2,627,598 and is mechanically ganged to the variable delay circuit 52 by suitable mechanical linkage (not shown) which permits one complete revolution, corresponding to a 360° phase shift, of the phase shifter 66 for a change in delay time equal to one period at the freqeuncy of the carrier of the received signals. The same fixed relationship between the triggers from the divider chain 16 and the cycles of the local oscillator output is set and maintained by the mechanical linkage between the delay triggers and the phase shifted output. This fixed linkage, as well as the fixed coupling between the oscillator 14 and divider 16, requires a substantially fixed phase relationship between the carrier and envelope of the received signals for unambiguous time measurement, as will hereinafter become more apparent.

Referring to Fig. 4, Fig. 4a shows a received pulse, for example a Y pulse from the slave station with its R.-F. cycle content. Fig. 4b shows the output of the derivative circuit 20 resulting from the Y pulse of Fig. 4a. Fig. 4b also represents the change in voltage at the output of the coincidence circuit 56 as a function of the time relationship between the output of the derivative circuit 20 and the delayed trigger from the delay circuit 52. It will be seen that if the relay 60 is caused to open when the output from the coincidence circuit 56 is reduced to the region indicated by the horizontal dotted lines in Fig. 4b, the phase shifter 66 will be adjusted to within one cycle of the desired cross-over point of the R.-F. signal at O in Fig. 4a. Thus the effect of the pulse matching servo loop including the coincidence circuit 56 is to resolve the cyclic ambiguity that otherwise would exist between the output of the phase shifter and the the received pulse carrier signal if cycle matching alone were used to make a time measurement.

By providing a suitable counter, such as indicated at 78, coupled to the output of the servomotor 54, an accurate time measurement between the X and Y pulses as measured between a particular cycle cross-over point in the carrier of the X pulse and corresponding cross-over point in the carrier signal of the Y pulse is provided.

Since, when the relay 60 drops out, the output of the phase shifter 66 must be adjusted within plus or minus a half cycle of the desired R.-F. carrier cross-over point, it is necessary that the phase relationship between the R.-F. carrier and the Y pulse envelope be fixed within an error of less than ± half and R.-F. cycle. Otherwise when the relay 60 opens, the cycle matching servo loop including the phase detector 68 adjusts the phase shifter 66 a cycle before or a cycle after the desired R.-F. cycle cross-over point and the reading of the counter 78 will be off by the period of one cycle.

A similar time measurement for the W pulse is made by a W pulse timer circuit indicated generally at 80 which controls a suitable counter 82 on which the time interval between the Z and W pulses is indicated. The W pulse timer is identical to the Y pulse timer circuit 51 except that the input trigger to the variable delay in the W pulse timer 80 is derived from the $e$ output of the divider chain 16 instead of the $d$ output, whereby the W pulse timer measures the interval from the Z pulse, rather than the X pulse as in the Y pulse timer 51.

The time indications on the counters 78 and 82 identify the hyperbolic lines of position on a loran chart. The point of intersection between these two hyperbolic lines of position then provides a fix corresponding to the position of the receiving station, as described in connection with Fig. 1. The ultimate accuracy of the indications of the counters 78 and 82 is improved by comparing the phase of corresponding zero cross-over points of the R.-F. cycles of the respective pulses. Cyclic ambiguity is resolved by adjusting the time difference to within ± a half cycle by measuring the time difference between the pulse envelopes first and then switching over to the cycle matching only when the time difference has been brought within this error.

The cycle matching arrangement of the present invention, in which a local oscillator is made phase coherent with the carrier of the master pulse and the phase shift required to make the output of the oscillator phase coherent with the R.-F. signal of the slave pulse is then measured, has heretofore been described in application Serial No. 92,797 filed May 12, 1949 in the name of Winslow Palmer now Patent No. 2,811,717. However, in the system therein disclosed no means was shown the resolving the cyclic ambiguity as such, but entirely separate time measurement of the pulse time difference was made by a pulse time comparator. The present invention provides a completely automatic system having the accuracy of cycle matching technique of time measurement which produces a single time difference reading in which any cyclic ambiguity error has been eliminated.

From the above description it will be seen that the various objects of the invention have been achieved by the provision of a completely automatic loran type receiver. The receiver achieves improved accuracy over standard loran by incorporating cycle matching in making time measurements. While the receiver is particularly adapted for operation in a low frequency long range loran system, it is not limited to low frequency system operation.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Receiving apparatus for measuring and indicating the time interval between a pair of received pulses of radio frequency energy transmitted from a master station and a slave station respectively, the two stations transmitting pulses continuously at a fixed repetition rate and the phase relationship between the carrier and pulse envelope of the transmitted signals being fixed, said receiving apparatus comprising means for generating a first local signal having substantially the same frequency as the carrier of the received signals from the master and slave stations, means synchronized with said first local signal generating means for generating first local pulses having substantially the same repetition rate as the pulses of the received signals and a correspondingly fixed phase relationship to the first local signal as established at the transmitting stations between the pulse envelopes and the carrier, a first servo loop including means for generating an error signal in response to the time difference between the pulses received from the master station and said first local pulses and means responsive to said error signal for varying the output frequency of said first local signal generating means to bring the first local pulses into substantial coincidence with the received master pulses, a second servo loop including means for generating an error signal in response to the phase difference between the carrier of the received master pulses and said first local signal and means responsive to said error signal for varying the output frequency of said first local signal generating means to bring the first local signal into phase coherence with the carrier of the received master pulses, first switching means controlled by the error signal producing means in the first servo loop for shifting control of the first local signal generating means from the first servo loop to the second servo loop when the first local pulses are in substantial coincidence with the received master pulses, means for generating a second local signal having substantially the same frequency as the carrier of the received signals, means synchronized with said second local signal generating means for generating second local pulses having substantially the same repetition rate as the received pulses and the correspondingly fixed phase relationship to the second local signal as established at the transmitting stations between the pulse envelopes and the carrier, a third servo loop including means for generating an error signal in response to the time difference between the pulses received from the slave station and said second local pulses and means responsive to said error signal for varying the output frequency of said second local signal generating means to bring the second local pulses into substantial coincidence with the received slave pulses, a fourth servo loop including means for generating an error signal in response to the phase difference between the second local signal and carrier of the received slave pulses and means responsive to said error signal for varying the output frequency of said second local signal generating means to bring the second local signal into phase coherence with the carrier of the received slave pulses, second switching means for shifting control of the second local signal generating means from the third servo loop to the fourth servo loop when the second local pulses are in substantial coincidence with the received slave pulses, and indicator means responsive to the time difference between the first and second local pulses and the phase difference between the first and second local signals for indicating the time difference between the master and slave signals as received.

2. Apparatus as defined in claim 1 wherein said means for generating the first local signal and means for generating first local pulses comprise a crystal-controlled oscillator and divider chain, the frequency of the oscillator being varied slightly by the first and second servo loops.

3. Apparatus as defined in claim 2 wherein said means for generating the second local signal and means for generating second local pulses comprise a variable phase shifter coupled to the output of the oscillator and a variable time delay circuit coupled to the output of the divider chain, the phase shifter and time delay circuit being controlled by the third and fourth servo loops.

4. Apparatus as defined in claim 3 wherein said phase shifter and time delay circuit are mechanically variable, the phase shifter and time delay circuit being synchronized by a mechanical linkage that varies the time delay by the period of one cycle at the carrier frequency for each 360° phase shift change of the phase shifter.

5. Apparatus as defined in claim 4 wherein said indicator means is mechanically actuated in synchronism with the phase shifter and time delay circuit.

6. Apparatus as defined in claim 1 wherein said first and second switching means each include a pair of relays, means for producing an output signal in response to substantial coincidence between the local pulses and a selected train of master or slave pulses, one relay being operated in response to said last-named means, said one relay selectively coupling said pulse time difference error signal and a fixed bias signal to the other of said relays, the other of said relays selectively coupling the pulse time difference error signal from the one relay and the phase responsive error signal of the associated servo loops to the means for controlling the frequency of the associated local signal generating means.

7. In a loran receiver, apparatus for generating local trigger pulses coincident with a predetermined point on the leading edge of the pulse envelope of received radio frequency pulses, said apparatus comprising means for generating a local continuous wave signal, means synchronized with said local signal generating means for generating local pulses having substantially the same repetition rate as the pulses of the received signals, a first servo loop including means for generating an error signal in response to the time difference between the received pulses and said local pulses and means responsive to said error signal for varying the output frequency of said local signal generating means to bring the local pulses into substantial coincidence with the received pulses, a second servo loop including means for generating an error signal in response to the phase difference between the carrier of the received pulses and said local signal, and means responsive to said error signal for varying the output frequency of said local signal generating means to bring the local signal into phase coherence with the carrier of the received pulses, and switching means controlled by the error signal producing means in the first servo loop for closing the second servo loop and opening the first servo loop when the local pulses are in substantial coincidence with the received pulses.

8. Apparatus as defined in claim 7 wherein said means for generating the local signal and means for generating local pulses comprise a crystal-controlled oscillator and divider chain, the frequency of the oscillator being varied slightly by the first and second servo loops.

9. Apparatus as defined in claim 7 wherein said switching means includes a pair of relays, means for producing an output signal in response to substantial coincidence between the local pulses and the received pulses, one relay being operated in response to said last-named means, said one relay selectively coupling said pulse time difference error signals and a fixed bias signal to the other of said relays, the other of said relays selectively coupling the pulse time difference error signal from the one relay and the phase responsive error signal of the associated servo loop to the means for controlling the frequency of the local signal generating means.

10. Receiving apparatus for measuring and indicating the time interval between a pair of received pulses of radio frequency energy at common carrier frequency, the pairs of pulses being received in groups at a predetermined repetition rate, said apparatus comprising means for generating groups of local triggers at substantially the repetition rate of the received pulse groups, means for generating a pair of local alternating current signals having substantially the same frequency as the radio frequency of the received pulses, means for simultaneously varying the repetition rate of the groups of triggers and the frequency of each of said local signals in response to a control signal, means for simultaneously varying the time interval between the pairs of triggers in each group and the phase relation between the pair of local signals in response to a control signal, means for synchronizing the triggers with the received pulses including pulse coincidence determining means responsive to the received pulses and the local triggers for generating first and second error signals indicative of the time relation between the respective received pulses and the corresponding local triggers and means responsive to said first and second error signals to provide first and second control signals for controlling respectively said means for varying the repetition rate of the groups of triggers and said means for varying the time interval between the pairs of triggers, means synchonizing the local alternating current signals with the carriers of the received pulses including phase comparator means responsive to the carriers of the received pulses and said local signals for generating third and fourth error signals indicative of the phase relation between the respective carriers of the received pulses and the corresponding local alternating current signals and means responsive to said third and fourth error signals to provide third and fourth control signals for controlling respectively said means for varying the frequency of said local alternating current signals and said means for varying the phase relation between the pair of local signals, means responsive to the first control signal for shifting control of said means for simultaneously varying the repetition rate fo the trigger groups and the frequency of the local signals from said first control signal to said third control signal when the first control signal is substantially at a predetermined value, means responsive to the second control signal for shifting control of said means for simultaneously varying the time interval between triggers and the phase relation between local pulses to said fourth control signal when the second control signal is substantially at a predetermined value, and means responsive to said means for simultaneously varying the time relation between triggers and the phase relation between local signals for indicating accurately said time interval.

No references cited.